US008970359B2

(12) United States Patent
Barth et al.

(10) Patent No.: US 8,970,359 B2
(45) Date of Patent: Mar. 3, 2015

(54) METHOD AND DEVICE FOR WEAR DIAGNOSIS OF A MOTOR VEHICLE

(75) Inventors: Reinhard Barth, Regensburg (DE); Thierry Caramigeas, Limoges (FR); Matthieu Grolleau, Strasbourg (FR); Suraj Kiran, Regensburg (FR); Olivier Lobey, Nice (FR)

(73) Assignee: Continental Automotive GmbH, Hanover (DE)

( * ) Notice: Subject to any disclaimer, the term of this patent is extended or adjusted under 35 U.S.C. 154(b) by 1008 days.

(21) Appl. No.: 13/121,631

(22) PCT Filed: Aug. 20, 2009

(86) PCT No.: PCT/EP2009/060794
§ 371 (c)(1), (2), (4) Date: Jun. 20, 2011

(87) PCT Pub. No.: WO2010/037596
PCT Pub. Date: Apr. 8, 2010

(65) Prior Publication Data

US 2011/0234391 A1 Sep. 29, 2011

(30) Foreign Application Priority Data

Sep. 30, 2008 (DE) ........................ 10 2008 049 754

(51) Int. Cl.
*B60Q 1/00* (2006.01)
*G07C 5/00* (2006.01)
*G07C 5/08* (2006.01)

(52) U.S. Cl.
CPC ............. *G07C 5/006* (2013.01); *G07C 5/0808* (2013.01)
USPC ........ 340/438; 340/439; 340/454; 340/425.5; 701/29.1; 701/31.9; 701/30.9; 701/34.4

(58) Field of Classification Search
USPC ........... 340/438, 439, 454, 425.5; 701/29, 33, 701/34, 35, 30, 123, 29.1, 33.1, 31.9, 32.1, 701/29.9, 30.1, 30.2, 30.9, 34.4
See application file for complete search history.

(56) References Cited

U.S. PATENT DOCUMENTS 6,170,547 B1 * 1/2001 Shimizu ........................ 152/533
6,269,690 B1 * 8/2001 Shimizu et al. ................. 73/146
(Continued)

FOREIGN PATENT DOCUMENTS

AT 504028 A2 1/2008 ............ G01M 17/00
DE 10144076 A1 3/2003 ............. B60T 17/22
(Continued)

OTHER PUBLICATIONS

International Search Report and Written Opinion for Application No. PCT/EP2009/060794 (13 pages), Nov. 25, 2009.

*Primary Examiner* — Hoi Lau
(74) *Attorney, Agent, or Firm* — King & Spalding L.L.P.

(57) ABSTRACT

In a method and a device for wear diagnosis of a motor vehicle, driving events and driving conditions occurring during driving operation are detected, the detected driving events and driving conditions are assigned in each case a wear index value using a table which is stored in a memory of the motor vehicle and which adds up the wear index values assigned to the detected driving events and driving conditions in order to form a total wear index value, and the determined total wear index value is compared with a reference total wear index value derived from a stored characteristic curve.

14 Claims, 2 Drawing Sheets

(56) References Cited

U.S. PATENT DOCUMENTS

| | | | | |
|---|---|---|---|---|
| 6,609,051 | B2 * | 8/2003 | Fiechter et al. | 701/29.3 |
| 7,729,823 | B2 * | 6/2010 | Ruoppolo | 701/29.3 |
| 2003/0095038 | A1 * | 5/2003 | Dix | 340/425.5 |
| 2003/0114965 | A1 * | 6/2003 | Fiechter et al. | 701/29 |
| 2004/0073339 | A1 * | 4/2004 | Ruoppolo | 701/1 |
| 2004/0148061 | A1 | 7/2004 | Polzin et al. | G06F 17/00 |
| 2005/0049835 | A1 | 3/2005 | Mayer et al. | G06F 11/30 |
| 2006/0161326 | A1 * | 7/2006 | Jaeggle et al. | 701/67 |
| 2006/0199894 | A1 * | 9/2006 | Nakayama et al. | 524/496 |
| 2007/0027593 | A1 * | 2/2007 | Shah et al. | 701/30 |
| 2009/0118897 | A1 | 5/2009 | Schoeggl | 701/29 |
| 2010/0228423 | A1 * | 9/2010 | Howell et al. | 701/29 |
| 2011/0234391 | A1 | 9/2011 | Barth et al. | 340/438 |
| 2012/0197548 | A1 * | 8/2012 | Kuramoto et al. | 702/34 |

FOREIGN PATENT DOCUMENTS

| | | | | |
|---|---|---|---|---|
| DE | 10257793 | A1 | 7/2004 | G01M 13/00 |
| DE | 102005048532 | A1 | 4/2007 | F02B 77/08 |
| DE | 102008049754 | A1 | 4/2010 | G07C 5/08 |
| EP | 0661673 | A1 | 7/1995 | G07C 5/00 |
| EP | 0863490 | A2 | 9/1998 | B60R 16/02 |
| EP | 0863490 | B1 | 1/2007 | B60R 16/02 |
| FR | 2847546 | A1 | 5/2004 | B60R 16/02 |
| WO | 2010/037596 | A1 | 4/2010 | G07C 5/00 |

* cited by examiner

METHOD AND DEVICE FOR WEAR DIAGNOSIS OF A MOTOR VEHICLE

CROSS-REFERENCE TO RELATED APPLICATIONS

This application is a U.S. National Stage Application of International Application No. PCT/EP2009/060794 filed Aug. 20, 2009, which designates the United States of America, and claims priority to German Application No. 10 2008 049 754.1 filed Sep. 30, 2008, the contents of which are hereby incorporated by reference in their entirety.

TECHNICAL FIELD

The invention relates to a method and a device for wear diagnosis of a motor vehicle.

BACKGROUND

DE 101 44 076 A1 discloses a device and a method for the early detection and prediction of damage to the assemblies of a machine system. For this purpose, the solid-borne sound of the machine system is detected by a sensor, output as an acceleration signal and analyzed in a digital signal processor. In order to avoid adverse influences of vibrations in the surroundings and of solid-borne sound waves which are not associated with the state of the machine system, the acceleration signal is firstly transformed into the frequency range by means of a fast Fourier transformation. The data which are obtained as a result are then transformed into the time domain again by means of a cepstrum analysis, with the result that resonance data are obtained from individual pulses in the time domain. This cepstrum is then compared with a comparison cepstrum which is correspondingly available to load signals and rotational speed signals for the present operating state in a new machine system in a storage device. When limiting values are exceeded, the diagnosis signal, in particular information about the assembly which is diagnosed as being damaged and its predicted remaining service life, are displayed to the user and an emergency operation is initiated.

SUMMARY

According to various embodiments, a method and a device for wear diagnosis of a motor vehicle can be specified in which the expenditure is reduced.

According to an embodiment, a method for wear diagnosis of a motor vehicle, may have the following steps: —detection of driving events and driving conditions occurring during the driving operation of the motor vehicle, —assignment of the detected driving events and driving conditions in each case to a wear index value using a table which is stored in a memory of the motor vehicle, —addition of the wear index values assigned to the detected driving events and driving conditions in order to form a total wear index value, and —comparison of the total wear index value with a reference total wear index value derived from a stored reference characteristic curve.

According to a further embodiment, the method may have the following further steps: —production of an assignment table in which in each case a wear index value is assigned to a multiplicity of driving events and driving conditions, —production of a reference characteristic curve for the total wear index value, and —storage of the assignment table and of the reference characteristic curve in the memory of the motor vehicle. According to a further embodiment, the comparison of the total wear index value with the reference total wear index value derived from the reference characteristic curve can be carried out at predefined kilometer readings of the motor vehicle. According to a further embodiment, the comparison of the total wear index value with the reference total wear index value derived from the reference characteristic curve can be carried out at predefined time intervals. According to a further embodiment, the reference characteristic curve may comprise reference total wear index values which are each assigned to a kilometer reading of the motor vehicle. According to a further embodiment, a reference total wear index value which is assigned to a desired overall service life of the motor vehicle can be predefined. According to a further embodiment, if a total wear index value determined during the driving operation is larger than an associated reference total wear index value derived from the reference characteristic curve, an acoustic and/or visual warning signal can be output. According to a further embodiment, if a total wear index value determined during the driving operation is larger than an associated reference total wear index value derived from the reference characteristic curve, a warning signal can be stored in a fault memory of the motor vehicle. According to a further embodiment, if a total wear index value determined during the driving operation is larger than an associated reference total wear index value derived from the reference characteristic curve, one or more vehicle assemblies can be actuated in such a way that the future wear occurring during the driving operation is reduced.

According to another embodiment, a device for wear diagnosis of a motor vehicle, may have a control unit which detects driving events and driving conditions occurring during the driving operation of the motor vehicle, a memory in which an assignment table is stored, according to which assignment table driving events and driving conditions are each assigned a wear index value, and a memory in which a reference characteristic curve is stored, according to which reference characteristic curve predefined kilometer readings of the motor vehicle are each assigned a reference total wear index value, wherein the control unit is provided to assign in each case a wear index value to driving events and driving conditions detected during the driving operation, using the stored assignment table, to add these wear index values to form a total wear index value and to compare the total wear index value with an associated reference total wear index value derived from the stored reference characteristic curve.

According to a further embodiment of the device, the device may have a memory which is provided for storing the total wear index value determined during the driving operation. According to a further embodiment of the device, the comparison of the total wear index value determined during the driving operation with an associated reference total wear index value derived from the stored reference characteristic curve can be carried out by the control unit at predefined kilometer readings of the motor vehicle. According to a further embodiment of the device, the comparison of the total wear index value determined during the driving operation with an associated reference total wear index value derived from the stored reference characteristic curve can be carried out by the control unit at predefined time intervals. According to a further embodiment of the device, when a total wear index value determined during the driving operation is larger than an associated reference total wear index value derived from the reference characteristic curve, the control unit may actuate an output unit in such a way that an acoustic and/or visual warning signal is output. According to a further embodiment of the device, when a total wear index value determined during the driving operation is larger than an associated reference total wear index value derived from the reference characteristic curve, the control unit may initiate storage of a warning signal in a fault memory of the motor vehicle. According to a further embodiment of the device, when a total wear index value determined during the driving operation is larger than an associated reference total wear index value derived from the reference characteristic curve, the control unit may actuate one or more vehicle assemblies in such a way that the wear occurring during the driving operation is reduced.

BRIEF DESCRIPTION OF THE DRAWINGS

Further advantageous properties of the invention emerge from the exemplary explanation thereof on the basis of the figures, of which.

DETAILED DESCRIPTION

Figure 1:
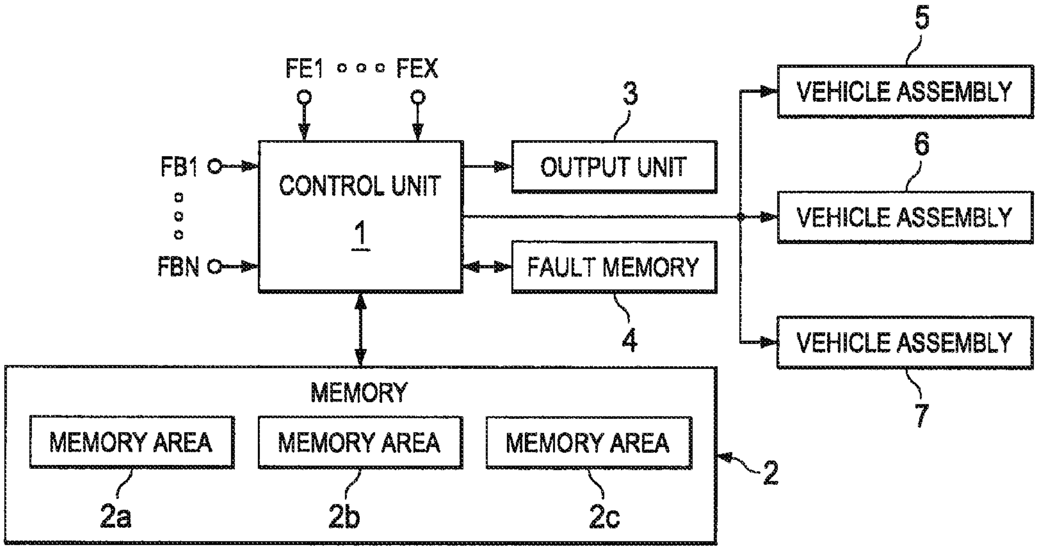
FIG. 1 is a block illustration of a device for carrying out a method for wear diagnosis of a motor vehicle.

The advantages of various embodiments comprise, in particular, the fact that a motor vehicle is considered in a comprehensive fashion within the scope of the wear diagnosis. During the operation of a motor vehicle, a multiplicity of different driving events and driving conditions occur. The driving events are processes which are influenced by the driver of the vehicle. These include, for example, driving at high rotational speeds, what are referred to as racing starts, frequent hard braking, driving at high speed, frequent depressing of the accelerator pedal, a large number of journeys over short distances, frequent start/stop processes, driving with a large payload, frequent journeys on gradients, long journeys on freeways etc. The driving conditions are, for example, the external temperature, the air humidity, the altitude at which the motor vehicle is being operated. All these driving events and driving conditions are respectively assigned a wear index value. If such a driving event or such a driving condition occurs during operation of the motor vehicle, this is detected by a control unit of the motor vehicle and a respectively associated wear index value is added to a previously present total wear index value in order to determine a new total wear index value. This total wear index value determined during the driving operation is compared with a reference total wear index value derived from a stored reference characteristic curve. This reference characteristic curve is preferably defined in such a way that when a target service life of the motor vehicle is reached, which is, for example, 250 000 km, the total wear index value reaches a wear index threshold value at which the motor vehicle is generally still roadworthy.

If, during the driving operation, the respectively determined total wear index value exceeds a total wear index value derived from the characteristic curve, a control unit of the motor vehicle can initiate measures which increase the service life of the vehicle. These measures include, for example, the outputting of an acoustic or visual message to the driver which requests the driver to change his driving behavior in order to increase the service life of the vehicle. These measures also include the storage of a fault signal in a fault memory of the motor vehicle. This fault signal can be read out by the service personnel when the vehicle is next serviced and can be converted into measures which increase the service life of the vehicle, for example by exchanging certain vehicle assemblies. Furthermore, these measures include intervention by the control unit in the driving operation, which is largely unnoticed by the driver of the vehicle. This intervention can, for example, consist in the control unit limiting the maximum rotational speed of the motor, limiting the maximum torque of the motor, or limiting the temperature range within which a start/stop operation can be carried out, etc. All of these interventions by the control unit serve to reduce the wear which will occur in future during the driving operation, thereby increasing the service life of the motor vehicle.

FIG. 1 is a block illustration of a device for carrying out a method for wear diagnosis of a motor vehicle. According to this block illustration, the motor vehicle has a control unit 1 which contains a microcomputer. During the operation of the motor vehicle, driving condition signals FB1, . . . , FBN and driving event signals FE1, . . . , FEX are fed to the control unit 1. The driving condition signals are signals which cannot be influenced by the driver of the vehicle and which describe the driving environment. These include, for example, information about the external temperature derived from an external temperature sensor, information about the air humidity derived from a moisture sensor, etc. The driving event signals are signals which can be influenced by the driver of the vehicle, for example information about the instantaneous velocity, information about the depressing of the accelerator pedal, information about engaged full braking, information about the rotational speed, information about the presence of a start/stop operation, information about the instantaneous payload of the vehicle, information about the instantaneous route profile, information derived from the kilometer or distance reading of the vehicle etc. These driving event signals are either likewise derived from sensors of the vehicle or are based on operator control activities by the driver.

Furthermore, the control unit 1 is connected to a memory 2. The latter contains memory areas 2*a*, 2*b* and 2*c*.

Data which correspond to an assignment table are written into the memory area 2*a* at the factory when the vehicle is fabricated. According to this assignment table, in each case a wear index value is assigned to a multiplicity of driving events and driving conditions. A simplified example of such an assignment table is given in the following table: Wear Index Value Driving condition, driving event

| | |
|---|---|
| 1 | Start/stop process; activation of the starter; traveling at 100 km; high air humidity |
| 2 | External temperature higher than 35° C.; depressing of the accelerator pedal; |
| 3 | Large payload; high velocity; |
| 4 | Frequent hard braking; |
| 5 | Unsuitable fuel; excessively high engine speed; excessively high engine temperature; too little cooling fluid |

Figure 2:
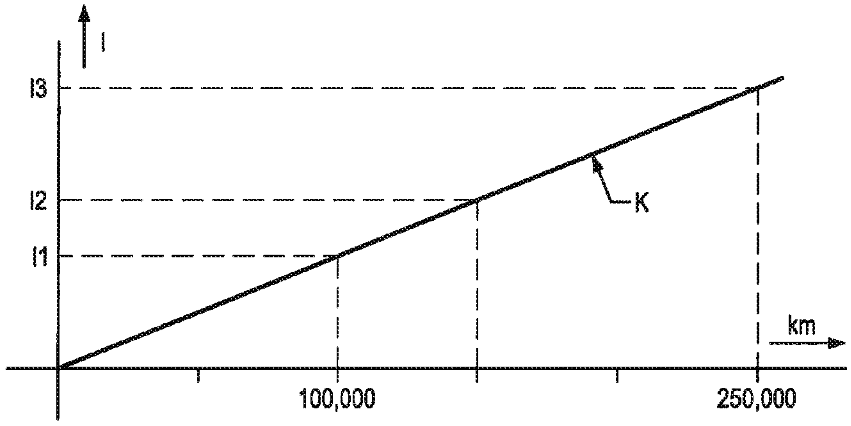
FIG. 2 is a diagram with a reference characteristic curve for a total wear index value.

Data which correspond to a reference characteristic curve for a total wear index value are also written into the memory area 2*b* at the factory when the vehicle is fabricated. An example of such a reference characteristic curve is shown in FIG. 2. Here, the wear index I is plotted along the ordinate, and the vehicle kilometer or distance reading is plotted along the abscissa. In the example shown in FIG. 2, it has been assumed that the overall service life of the motor vehicle corresponds to a kilometer or distance reading of 250 000 and that the motor vehicle can have a total wear index value of at maximum I3 at the end of this overall service life for said vehicle to still be in the roadworthy state. In the exemplary embodiment shown, the reference characteristic curve K has a linear profile. Each kilometer or distance reading of the vehicle from 0 km to 250 000 km is respectively assigned a reference total wear index value, as is apparent from FIG. 2. For example, a vehicle kilometer or distance reading of 100 000 km is assigned a reference total wear index value I1, and a vehicle kilometer or distance reading of 150 000 km is assigned a reference total wear index value I2. In order to save storage space, the stored characteristic curve may merely comprise total wear index values for integral multiples of, for example, 5000 km. During operation of the motor vehicle, the control unit 1 assigns a wear index value to each driving event which occurs and to each detected driving condition using the assignment table stored in the memory area 2*a*, and said control unit carries out addition of the wear index values assigned to the detected driving events and driving conditions. As a result, a total wear index value is formed which, during driving, is increased by the respectively assigned wear index value for each detected driving condition and for each detected driving event.

The specified total wear index value which is formed during the driving operation of the motor vehicle by adding wear index values which are respectively assigned to different desired and undesired driving conditions and driving events which occur repeatedly in practice, when predefined kilometer or distance readings are reached, for example at kilometer intervals of respectively 5000 km, is compared by the control unit 1 with the reference total wear index value which is associated with the respective kilometer or distance reading and which is derived by the control unit 1 from the reference characteristic curve stored in the memory area 2*b*.

If this comparison reveals that the total wear index value which is determined during the driving operation by the addition of wear index values is smaller than the reference total wear index value which can be obtained from the reference characteristic curve, or is only slightly larger than said reference total wear index value, this information is stored in a suitable form in memory 4, which is the fault memory of the motor vehicle. This information can be read out by the workshop personnel when the vehicle is next serviced and can be noted, for example, in the customer's service record for the motor vehicle.

On the other hand, if the specified comparison reveals that the total wear index value which is determined during the driving operation by the addition of wear index values is greater by more than a permitted tolerance threshold than the reference total wear index value which can be obtained from the reference characteristic curve, one or more of the following measures are initiated by the control unit 1.

A first measure is to instruct the driver of the motor vehicle, by means of a visual and/or acoustic output unit 3, that he must change his driving style if he values increasing the service life of the motor vehicle.

A second measure is to store this information in a suitable form in the fault memory 4, with the result that the workshop personnel can read said information out of the fault memory when the vehicle is next serviced, and can note said information in, for example, the customer service record for the motor vehicle.

A third measure is that the control unit 1 automatically initiates measures which remain largely unnoticed by the driver of the vehicle but which reduce the future wear of the motor vehicle. These measures, consist, for example, in actuating one or more of the vehicle assemblies 5, 6 and 7 in such a way that future wear of the respective assembly and therefore of the motor vehicle is reduced. Examples of such measures are limiting the maximum torque of the engine of the motor vehicle, limiting the maximum rotation speed of the engine, initiating cooling of a vehicle assembly, or changing the engine temperature range within which the start/stop operation can be carried out.

One development consists in counting individual driving events and storing these counting values the current total wear index value in the memory area 2*c* of the memory 2. On the basis of these counting values, the control unit 1 can draw conclusions about the need to exchange a respective vehicle part and can display an indication of this need by means of the output unit 3 and/or store said indication in the fault memory 4. On the basis of this indication, the driver of the vehicle or the workshop personnel can ensure that the specified vehicle part is exchanged before this vehicle part becomes completely defective and causes failure of the vehicle or adversely affects the driving safety.

Figure 3:
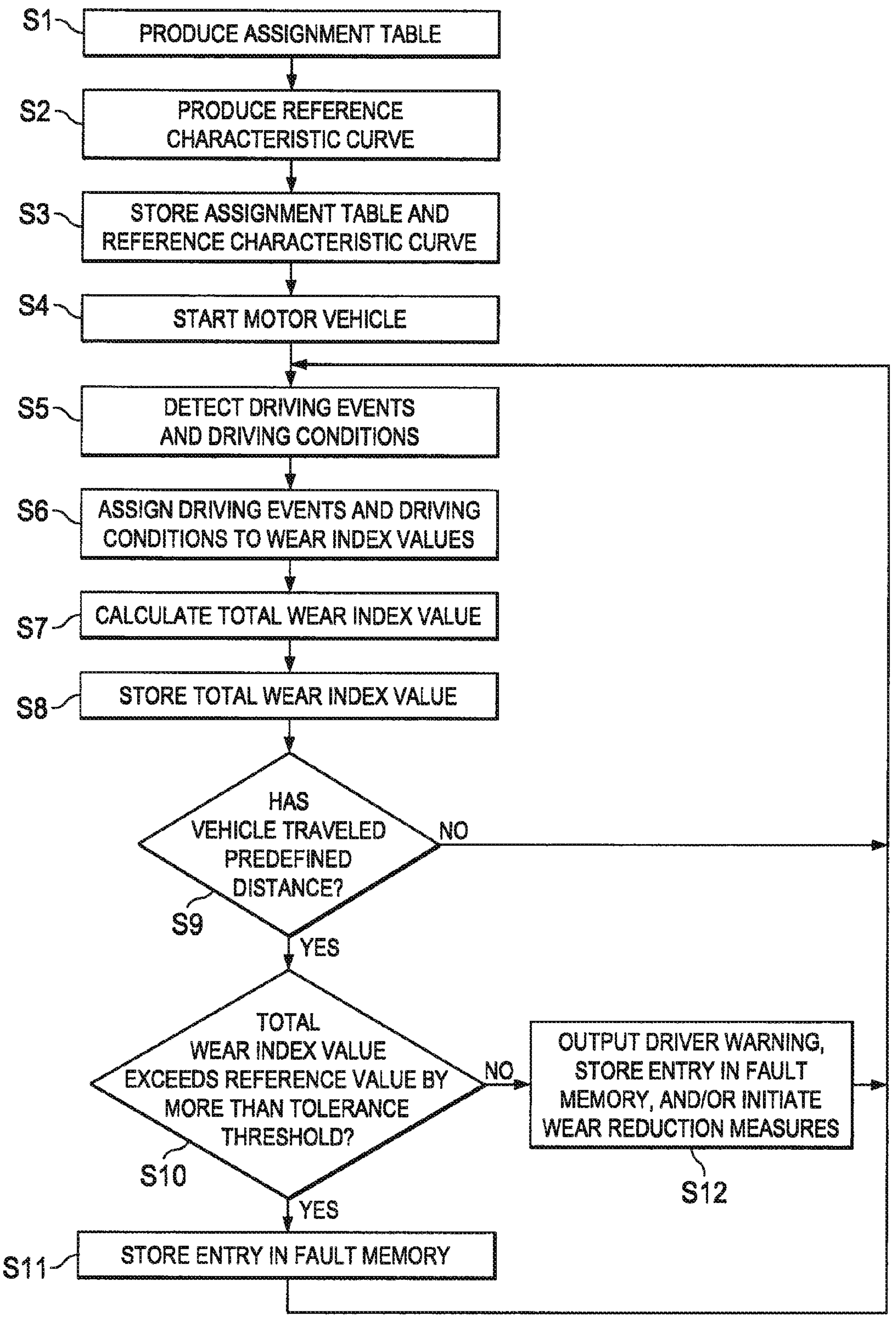
FIG. 3 is flowchart illustrating a method according to various embodiments.

FIG. 3 shows a flowchart for illustrating a method according to various embodiments.

In step S1, the production of the assignment table in which in each case a wear index value is assigned to a multiplicity of driving events and driving conditions is carried out at the factory within the scope of the fabrication of the motor vehicle.

This is followed in step S2 by the production of the reference characteristic curve for the total wear index value.

Then, in step S3 the assignment table and the data which are assigned to the specified reference characteristic curve are stored in the memory areas 2*a* and 2*b* of the memory 2 of the motor vehicle.

During the later operation of the motor vehicle, the motor vehicle is started in a step S4.

This is followed according to step S5 by the detection of driving events and driving conditions occurring during the driving operation by means of the control unit 1.

Then, in step S6 the detected driving events and driving conditions are each assigned to a wear index value by means of the control unit 1 using the assignment table stored in the memory 2.

This is followed in step S7 by the wear index values which are assigned to the detected driving events and driving conditions being added by means of the control unit 1 in order to form a total wear index value.

In the subsequent step S8, the total wear index value determined by addition is stored in the memory area 2*c* of the memory 2.

Then, in step S9 a check is carried out to find out whether the kilometer or distance reading of the motor vehicle has reached a predefined kilometer or distance reading. If this is not the case, the program jumps back to step S5. If this is the case, the program continues to step S10.

In step S10, the total wear index value which is formed by addition is compared with an associated reference total wear index value which is derived by the control unit 1 from the memory area 2*b* of the memory 2 in order to determine whether or not the total wear index value formed by addition exceeds the associated reference total wear index value by more than a predefined tolerance threshold. If this is not the case, a transition to step S11 takes place. If this is the case, a transition to step S12 takes place.

In step S11, an entry is made in the fault memory 4, which entry contains information to the effect that the total wear index value formed by addition does not exceed the associated reference total wear index value by more than the predefined tolerance value. There is then a jump back to step S5.

In the step S12, the control unit 1 takes one or more of the following measures:

Outputting of acoustic or visual information by means of the output unit 3 which informs the driver that the total wear index value determined by addition exceeds the associated reference total wear index value by more than the predefined tolerance threshold, and that the driver must change his driving style if he wishes to increase the overall service life of his motor vehicle;

Storage of information indicating that the total wear index value determined by addition exceeds the associated reference total wear index value by more than a predefined tolerance threshold, in the fault memory 4;

Automatic initiation of measures which reduce the future vehicle wear.

There is then a jump back to step S5.

The various embodiments relate, according to all the above, to a method and a device for wear diagnosis of a motor vehicle in which driving events and driving conditions occurring during the operation of a motor vehicle are detected, the detected driving events and driving conditions are each assigned a wear index value using an assignment table stored in a memory, these wear index values are added in order to form a total wear index value, and the total wear index value is compared with a reference total wear index value derived from a stored reference characteristic curve. Prognoses as to whether the respective motor vehicle is expected to reach a predefined overall service life given an unchanged driving behavior and whether the driver must, under certain circumstances, change his driving habits in order to ensure this overall service life of the motor vehicle, can be derived from the comparison result. Furthermore, the control unit of the motor vehicle can, where necessary, automatically initiate measures which reduce the future wear of the motor vehicle itself given unchanged driving behavior of the driver.

What is claimed is:

1. A method for wear diagnosis of a motor vehicle, comprising:

detecting driving events and driving conditions occurring during the driving operation of the motor vehicle, assigning each of the detected driving events and driving conditions to a wear index value using a table which is stored in a memory of the motor vehicle, adding the wear index values assigned to the detected driving events and driving conditions to calculate a total wear index value, and at predefined distance readings of the motor vehicle, comparing the total wear index value with an associated reference total wear index value defined by stored reference characteristic information.

2. The method according to claim 1, further comprising:

producing an assignment table in which in each case a wear index value is assigned to a multiplicity of driving events and driving conditions, producing a reference characteristic curve for the total wear index value, the reference characteristic curve comprising reference characteristic information defining reference total wear index values associated with different predefined distance readings of the motor vehicle, and storing the assignment table and the reference characteristic curve in the memory of the motor vehicle.

3. The method according to claim 1, wherein the step of comparing the total wear index value with an associated reference total wear index value at predefined distance readings of the motor vehicle comprises at each of a plurality of predefined distance readings of the motor vehicle, comparing the total wear index value at that distance reading with a reference total wear index value assigned to that distance reading.

4. The method according to claim 3, wherein a reference total wear index value which is assigned to a desired overall service life of the motor vehicle is predefined.

5. The method according to claim 1, wherein if a total wear index value determined during the driving operation is larger than an associated reference total wear index value defined by the reference characteristic information, at least one of an acoustic warning signal and a visual warning signal is output.

6. The method according to claim 1, wherein if a total wear index value determined during the driving operation is larger than an associated reference total wear index value defined by the reference characteristic information, a warning signal is stored in a fault memory of the motor vehicle.

7. The method according to claim 1, wherein if a total wear index value determined during the driving operation is larger than an associated reference total wear index value defined by the reference characteristic information, one or more vehicle wear reduction measures are actuated.

8. A device for wear diagnosis of a motor vehicle, comprising:

a control unit configured to detect driving events and driving conditions occurring during the driving operation of the motor vehicle, and a memory storing:

an assignment table, according to which assignment table driving events and driving conditions are each assigned a wear index value, and to store reference characteristic information assigning reference total wear index values to predefined distance readings of the motor vehicle, and wherein the control unit is further configured to:

assign a wear index value to each of the driving events and driving conditions detected during the driving operation, based on the stored assignment table, add the wear index values assigned to the driving events and driving conditions to calculate a total wear index value, and at predefined distance readings of the motor vehicle, compare the total wear index value with an associated reference total wear index value defined by the stored reference characteristic information.

9. The device according to claim 8, comprising a memory configured to store the total wear index values calculated value determined during the driving operation.

10. The device according to claim 8, wherein when a total wear index value determined during the driving operation is larger than an associated reference total wear index value defined by the reference characteristic information, the control unit actuates an output unit to output at least one of an acoustic and a visual warning signal.

11. The device according to claim 8, wherein when a total wear index value determined during the driving operation is larger than an associated reference total wear index value defined by the reference characteristic information, the control unit initiates storage of a warning signal in a fault memory of the motor vehicle.

12. The device according to claim 8, wherein when a total wear index value determined during the driving operation is larger than an associated reference total wear index value defined by the reference characteristic information, the control unit actuates one or more vehicle wear reduction measures.

13. A method for wear diagnosis of a motor vehicle, comprising:

detecting a plurality of driving events and driving conditions occurring during the driving operation of the motor vehicle, assigning, by a processor, a wear index value to each detected driving event and each detected driving condition, calculating, by the processor, a total wear index value based on the wear index values assigned to the plurality of detected driving events and driving conditions, and at predefined distance readings of the motor vehicle, comparing the total wear index value with an associated reference total wear index value defined by stored reference data.

14. A method for wear diagnosis of a motor vehicle, comprising:

detecting a plurality of driving events occurring during the driving operation of the motor vehicle, assigning, by a processor, a wear index value to each detected driving event, calculating, by the processor, a total wear index value based on the wear index values assigned to the plurality of detected driving events, and at predefined distance readings of the motor vehicle, comparing the total wear index value with an associated reference total wear index value defined by stored reference data.

* * * * *